June 5, 1956  A. P. FERGUESON  2,749,171
AUXILIARY BUMPER
Filed Oct. 25, 1950  2 Sheets-Sheet 1
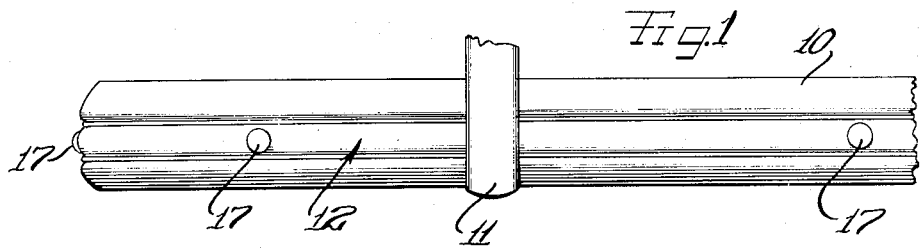
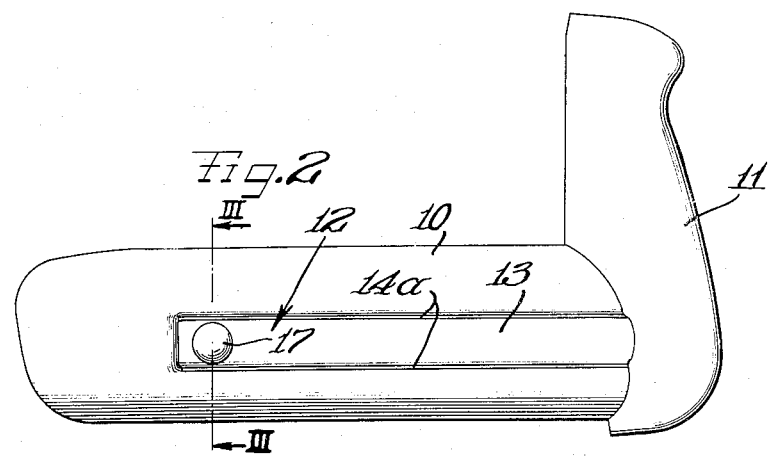
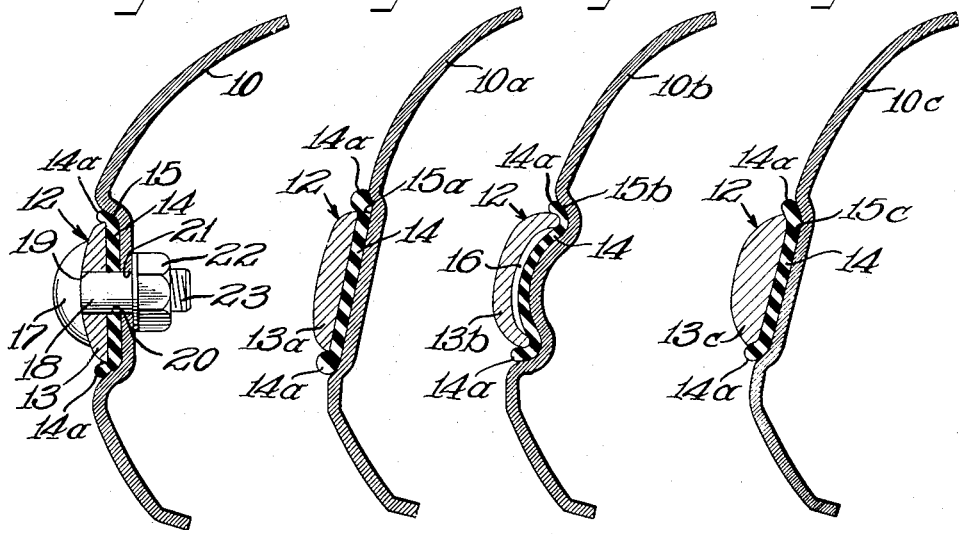
Inventor
Arthur P. Fergueson

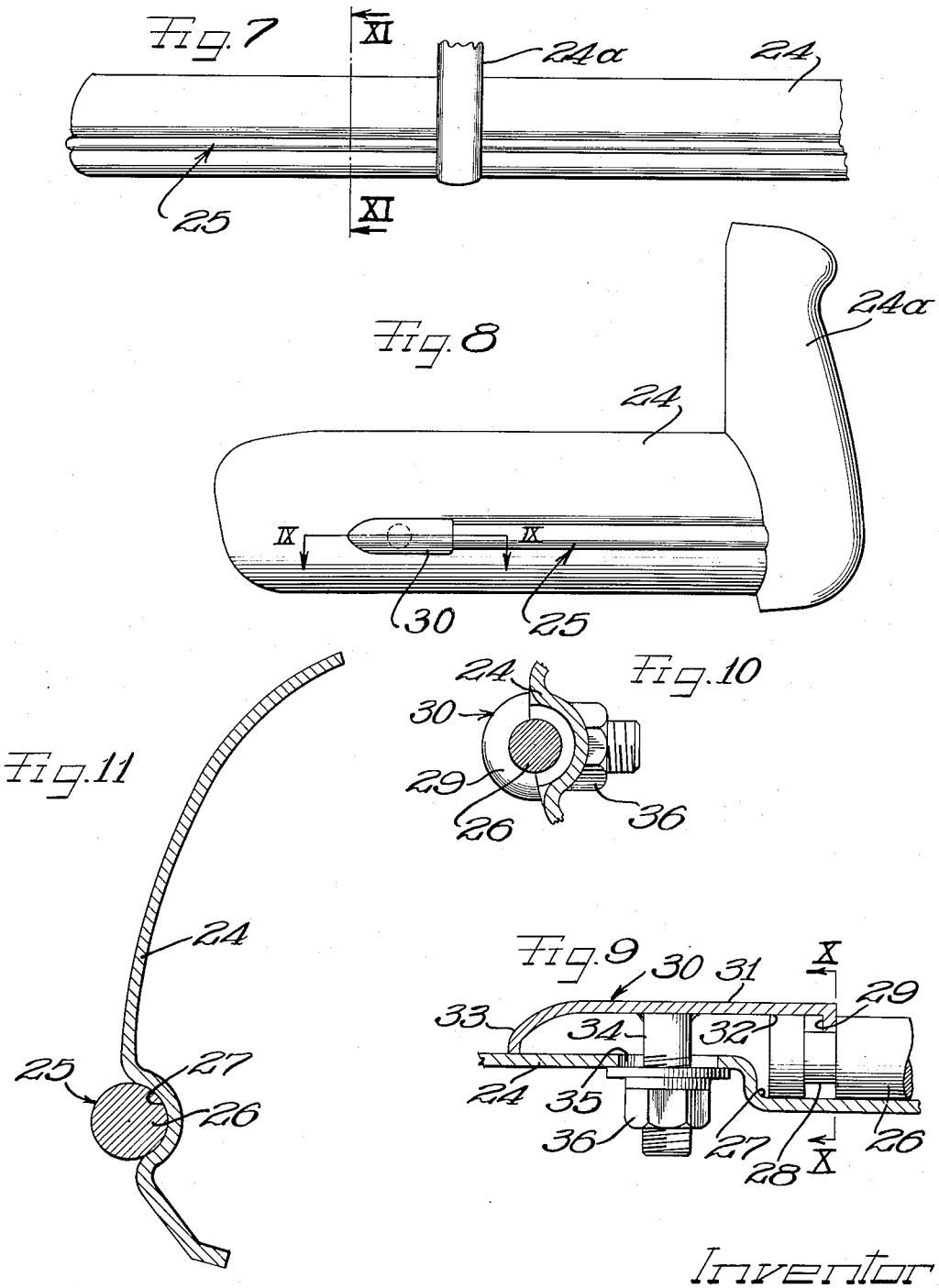

United States Patent Office 2,749,171
Patented June 5, 1956

2,749,171
AUXILIARY BUMPER

Arthur Pierce Fergueson, Huntington Woods, Mich., assignor to Houdaille Industries, Inc., a corporation of Michigan Application October 25, 1950, Serial No. 192,112

8 Claims. (Cl. 293—71)

The present invention relates in general to automobile bumpers and more particularly to an auxiliary bumper or buffer for sheet metal bumpers.

Sheet metal automobile bumpers, for reasons of economy, are usually made from relatively low carbon steel which has a low resistance to denting and when subjected to an impact with or by an object and especially a sharp or small area object often become permanently deformed and dented, and thus unsightly.

To circumvent this problem, the present invention provides a horizontally disposed generally contour-conforming auxiliary bumper made of suitable hard resilient material, such as spring steel or any other suitable grade of dent-resisting steel. The horizontally disposed auxiliary bumper is positioned protectively on the main bumper in the vital contact areas where denting most frequently occurs.

Another advantage of the present invention is that the bumpers can now be made of thinner material, since the impacts will be protectively absorbed by the auxiliary bumper, thereby enabling a more economical bumper construction without sacrificing durability and attractiveness in appearance.

Accordingly, an object of the present invention is to provide a horizontally disposed auxiliary bumper for relatively thin sheet metal bumpers.

Another object of the present invention is to provide a horizontally disposed impact absorbing auxiliary bumper strip or bar to prevent denting and permanent deformation of sheet metal bumpers.

Another object of the present invention is to provide a bumper assembly economical to manufacture, but of greatly increased durability and without sacrificing appearance.

A feature of the present invention resides in a horizontally disposed auxiliary bumper secured to a main wide sheet metal bumper.

Another feature of the present invention resides in a resilient member to absorb impacts on the buffer member of an auxiliary bumper assembly.

Other objects, features and advantages of the present invention will be readily apparent from the following detailed description of certain preferred embodiments taken in conjunction with the accompanying drawings, in which:

Figure 1 is a fragmentary outer face elevational view of a wide sheet metal wrap-around type bumper having secured thereto an auxiliary bumper according to the present invention;

Figure 2 is an enlarged side elevational view of the bumper assembly shown in Fig. 1;

Figure 3 is an enlarged vertical sectional detail view taken substantially along the line III—III of Fig. 2;

Figure 4 is a sectional view similar to Fig. 3, but showing a modification;

Figure 5 is another similar sectional view showing a further modification;

Figure 6 is an additional similar sectional view showing still another modification;

Figure 7 is a fragmentary outer face elevational view of a further modified bumper and auxiliary bumper assembly;

Figure 8 is an enlarged side elevational view of the bumper assembly shown in Fig. 7;

Figure 9 is an enlarged horizontal sectional view taken substantially along the line IX—IX of Fig. 8;

Figure 10 is a transverse sectional view taken substantially along the line X—X of Fig. 9; and Figure 11 is an enlarged vertical sectional view taken along the line XI—XI of Fig. 7.

A sheet metal bumper 10 utilizing the present invention may be of the currently popular fairly massive appearing wrap-around type of substantial width and of outwardly bowed-cross section. Such a bumper may have various alternative design contours, as shown in Figs. 3, 4, 5 and 6.

The form of the bumper 10 shown in Figs. 1, 2 and 3 is of the type having substantially semi-circular cross section wherein the maximum outward bulge will occur at about the vertical central portion thereof. In the bumper modifications 10a, 10b and 10c, Figs. 4, 5 and 6, the cross section is more elliptical in shape wherein the maximum extent of the bulge will be nearer one margin, as for example at the lower marginal portion thereof. It is to be noted that the bulge or protrusion may also be at the upper marginal portion thereof by simply upending the forms shown. The usual vertically disposed bumper guards 11 are carried by the bumper 10 and are secured between the ends of the bumper in any suitable manner.

In accordance with the invention, for absorbing impacts in the vital outwardly bulging contact areas, where denting of the bumper 10 most frequently occurs, a horizontally disposed auxiliary bumper 12 is herein provided secured to the bumper 10 and having a contour conforming to the longitudinal or horizontal contour of the bumper 10.

The contour conforming auxiliary bumper 12 is placed in an outwardly projecting position relative to the bulge of the bumper to absorb impacts thereby avoiding denting and permanent deformation of the bumper.

For providing an impact contact surface for the auxiliary bumper 12, a buffer member 13 is provided which is made of hard resilient material, such as spring steel or other suitable dent-resisting material, and protrudes outward of the normal contour of the bumper 10 throughout substantially the whole length of the latter, thereby preventing denting and permanent deformation of the bumper 10 in those portions not protected by the bumper guards 11. Various alternate shapes may be provided for the buffer member 13 to accommodate various requirements or preferences, as identified by the reference numerals 13a, 13b and 13c (Figs. 4, 5 and 6). In each instance, the buffer member 13 has a longitudinal contour conforming to the contour of the associated bumper 10. As noted in the buffer member 13, the cross sectional area thereof is substantially semielliptical, and whereas the buffer members 13a and 13b have relatively wide flat surface contact areas. In buffer member 13c, the cross sectional area thereof is more massive and substantially semi-circular.

In order to provide an impact absorber for the buffer member 13 and for preventing contact between the hard-material buffer 13 and the relatively softer-material bumper 10, a cushioning member 14 is provided. The cushioning member 14 which is made of suitable resilient material such as rubber, and has protruding edge portions 14a extending at opposite sides thereof to prevent the buffer member 13 from contacting the relatively softer metal bumper 10. Therefore, regardless of the direction in which the buffer member 13 is hit, the buffer member 13 cannot contact the bumper 10. The edge portions 14a are constructed to conform to the shape of the seating surface of the buffer member 13.

For seating the auxiliary bumper assembly 12, a recess 15 is provided in the bumper 10. The recess 15 is also provided for facilitating the mounting of the auxiliary bumper 12, as well as preventing transverse displacement of the same.

Various shapes are provided for the recess 15, as shown by recesses 15a, 15b and 15c. The recess 15 may be a substantially deep vertical indentation for suitably seating a massive buffer member, and wherein the recesses 15b and 15c may be substantially narrow indentations thereby enabling the buffer member to be suitably seated, when positioned at an angle.

In the modification of Fig. 5, the auxiliary bumper buffer 13b is constructed to further aid the impact absorption by having an additional resilient effect. The recess 15b may be substantially sinuous in shape to provide deeply seated end portions thereby reducing lateral displacement. Conforming to the shape of the recess 15b is the cushioning member 14. Recess 16 is provided in the buffer member 13 to further improve the impact absorption of the auxiliary bumper 12 by permitting resilient movement of the buffer member 13b before contacting the cushioning member.

Suitable means are provided for securing the buffer member 13, and the cushioning member 14 to the bumper 10. In the present instance, clamping means in the form of bolts 17 are provided at suitable intervals and at least adjacent the ends of the buffer 13. Each bolt has a stem portion 18 extending through an aperture 19 of the buffer member 13, an aperture 20 of the cushioning member 14 and an aperture 21 of the bumper 10. A nut 22 is threaded onto the threaded portion 23 for tightly securing the auxiliary bumper assembly 12 to the bumper.

Referring now to Figures 7-10, for preventing dents and permanent deformation of a sheet metal bumper 24 by absorbing an impact, a more economical construction for a horizontally disposed contour conforming auxiliary bumper assembly 25 is herein provided in addition to the vertically disposed bumper guard 24a. The auxiliary bumper assembly 25 comprises a buffer member 26 made of suitable hard resilient material such as spring steel or other suitable grade steel or alloy or rod stock. The buffer member 26 is mounted to extend peripherally beyond the maximum bulge of the bumper contour in the vital contact areas where denting most frequently occurs.

In order to facilitate mounting of the auxiliary bumper assembly 25 and to seat the round rod shaped buffer member 26, a horizontal recess 27 is provided in or adjacent the bulge in the bumper 24. The recess 27 is shaped to conform to the horizontal contour of the buffer member 26 and prevents transverse displacement of the buffer member 26.

For mounting the buffer member 26 on the bumper 24, one or both end portions of the buffer member 26 have an annular groove 28 wherein is fitted a flange 29 forming one end of a retaining bar or clamp member 30. A portion 31 of the retaining bar 30 adjacent the flange 29 abuts against an annular head or shoulder 32 of the buffer member 26 to provide securing surface. The flange 29 prevents excessive longitudinal displacement of the buffer member 26. At the end opposite the flange 29, an inturned abutment flange portion 33 of the mounting bar 30 abuts against the bumper 24.

To tightly secure the mounting bar 30 to the bumper 24, a threaded stud 34 is permanently secured to the inner side of the mounting bar 30 in a suitable manner, such as welding. The stud 34 is received through a longitudinally elongated aperture 35 in the bumper 24. A nut 36 is threaded onto the stem of the stud and abuts against the bumper 24 to draw the bar 31 clampingly against the end portion of the buffer.

It will be understood that modifications and variations may be effected without departing from the scope of the novel concepts of the present invention.

I claim as my invention:

1. In a bumper assembly, a sheet metal bumper having a recessed area in the vital contact areas thereof, a buffer member in said recessed area and extending outward of the normal contour of said bumper for absorbing impact, a resilient member positioned in said recessed area between said buffer member and said bumper for cushioning said buffer member to cushion impact, and means securing said buffer member and said resilient member to said bumper member in the recessed area.

2. In a bumper assembly, a sheet metal bumper having a recessed area at the vital contact area, a buffer member in said recessed area and extending outward of the normal contour of said bumper for absorbing impact, a resilient member positioned in said recessed area between said buffer member and said bumper for cushioning said buffer member, projecting portions on said resilient member extending over the seating end portions of said buffer member for still further cushioning said buffer member, and means securing said buffer member and said resilient member to said bumper in the recessed area.

3. In a bumper assembly, a sheet metal bumper having a recessed area at the vital contact areas, a buffer member in said recessed area extending outward of the normal contour of said bumper for absorbing an impact, a resilient member seated in said recessed area between said buffer member and said bumper for cushioning said buffer member to further absorb impact, said buffer member being recessed at the inner surface thereof to provide a space between said resilient member and said buffer member for still further cushioning of impact, and means securing said buffer member and said resilient member to said bumper member in the recessed area.

4. In a bumper assembly, a sheet metal bumper having a recessed area at the vital contact areas, a buffer member in said recessed area and extending outward of the normal contour of said bumper for absorbing impact, a resilient member seated in said recessed area between said buffer member and said bumper for cushioning said buffer member to further absorb an impact, said recessed area having an irregularly curved surface for preventing lateral movement of said buffer member, and means securing said buffer member and said resilient member to said bumper in the recessed area.

5. In a bumper assembly, a sheet metal bumper having a recessed area at the vital contact areas, a buffer member in said recessed area and extending outward of the normal contour of said bumper for absorbing impact, a resilient member seated in said recessed area between said buffer member and said bumper for cushioning said buffer member to further absorb an impact, said buffer member being recessed at the inner surface thereof to provide a space between said resilient member and said buffer member for further cushioning of an impact, said bumper recessed area having an irregularly curved surface for preventing lateral movement of said buffer member, and means securing said buffer member and said resilient member to said bumper member in the bumper recessed area for preventing denting and permanent deformation to said bumper.

6. In combination in an automobile bumper construction, a bumper body of elongated form and substantial vertical width, said body comprising a sheet material of inherently low resistance to denting by impact thereagainst of fairly sharp objects, said body being of transversely outwardly bulging contour, the maximum bulging area of the body having therein a longitudinal groove defined by upper and lower spaced shoulders, a buffer member of elongated form and comprising a hard material of inherently high resistance to denting on impact, said buffer member having a rounded external hard impact surface, means securing said buffer member in said groove with the upper and lower sides of the buffer member opposed by said shoulders, the hard rounded impact surface of said buffer member projecting substantially beyond the maximum bulging portion of said bumper body to receive thereagainst impact of objects driving against said bumper in service, and a thin strip of resilient cushioning material between said buffer member and the bottom of said groove and having the edge portions of the cushioning strip extending between the upper and lower sides of the buffer member and said shoulders.

7. In combination in an automobile bumper construction, a bumper body of elongated form and substantial vertical width, said body comprising a sheet material of inherently low resistance to denting by impact thereagainst of fairly sharp objects, said body being of transversely outwardly bulging contour, the maximum bulging area of the body having therein a longitudinal groove defined by upper and lower spaced shoulders, a buffer member of elongated form and comprising a hard material of inherently high resistance to denting on impact, said buffer member having external hard impact surface, means securing said buffer member in said groove with the upper and lower sides of the buffer member opposed by said shoulders, the hard impact surface of said buffer member projecting substantially beyond the maximum bulging portion of said bumper body to receive thereagainst impact of objects driving against said bumper in service, and a thin strip of resilient cushioning material between said buffer member and the bottom of said groove and having the edge portions of the cushioning strip extending between the upper and lower sides of the buffer member and said shoulders.

8. In a vehicle bumper assembly, a sheet metal bumper having a recessed area in the vital contact portion thereof comprising spaced parallel grooves with an intermediate outwardly bulging portion therebetween, a buffer member in said recessed area and extending outward of the normal contour of the bumper for absorbing impact, said buffer member having a channel-shaped inner face with marginal portions projecting to the rear of the buffer and extending into said grooves with the outwardly projecting portion of the bumper between the grooves projecting into the channel in the buffer member, a resilient cushioning member positioned in said recessed area between said buffer member and said bumper and including said grooves for cushioning said buffer member to cushion impact, and means securing said buffer member and said resilient member to said bumper member in the recessed area.

References Cited in the file of this patent

UNITED STATES PATENTS

| | | |
|---|---|---|
| 1,754,112 | Lusse | Apr. 8, 1930 |
| 1,937,197 | Halladay | Nov. 28, 1933 |
| 2,054,838 | Short | Sept. 22, 1936 |
| 2,144,167 | Sanders | Jan. 17, 1939 |
| 2,531,967 | Bishop | Nov. 28, 1950 |

FOREIGN PATENTS

| | | |
|---|---|---|
| 607,141 | Great Britain | Aug. 26, 1948 |